US005240226A

United States Patent [19]

Bobst

[11] Patent Number: 5,240,226

[45] Date of Patent: Aug. 31, 1993

[54] FUEL DISPENSER AID

[76] Inventor: Jules M. Bobst, 80 Quarry Rd. - No. 24, Kutztown, Pa. 19530

[21] Appl. No.: 1,642

[22] Filed: Jan. 7, 1993

[51] Int. Cl.5 ................................ F16K 35/00

[52] U.S. Cl. ................................ 251/90; 251/111; 141/392; 74/526

[58] Field of Search ................ 251/90, 111; 141/392; 74/526

[56] References Cited

U.S. PATENT DOCUMENTS

| | | | |
|---|---|---|---|
| D. 297,810 | 9/1988 | Stafford | 251/90 |
| 4,095,629 | 6/1978 | Jordan | 251/90 |
| 4,176,695 | 12/1979 | Raske | 251/90 |
| 4,287,736 | 9/1981 | Hadgis | 251/90 |
| 4,690,182 | 9/1987 | Knaus | 251/111 |
| 4,712,766 | 12/1987 | Ehrenhalt | 251/90 |
| 4,811,765 | 3/1989 | Gibs | 251/90 |
| 4,846,447 | 6/1989 | Hanna | 141/92 |
| 4,874,151 | 10/1989 | Fritz | 251/90 |
| 5,118,074 | 6/1992 | Weissman | 251/90 |

FOREIGN PATENT DOCUMENTS

| | | | |
|---|---|---|---|
| 542607 | 8/1922 | France | 251/90 |

*Primary Examiner*—A. Michael Chambers

*Attorney, Agent, or Firm*—Antonelli, Terry, Stout & Kraus

[57] ABSTRACT

A fuel dispenser aid holds a trigger-like valve operating lever relative to a pistol grip-like handle portion of a valving device for dispensing gasoline or other fuels through a nozzle of the valving device without continuously manually holding the operating lever. The dispenser aid includes a mounting member formed of a material having a resilient, shape retaining character configured for mounting over the pistol grip-like handle portion of the valving device, a flexible strap secured at a first end thereof to the mounting member and extending freely therefrom so that it can be looped under the trigger-like valve operating lever and up to the mounting member and an arrangement for releasably and adjustably fastening the free portion of the strap to the mounting member. The mounting member is configured such that it can be held in one hand and clipped over the handle portion of the valving device in such a manner that the fingers of the one hand can both actuate the operating lever and loop the strap under and up to the mounting member to releasably fasten the strap thereon for securing the operating lever in the desired actuated dispensing position. The fuel dispenser aid offers the advantages of simplicity, relatively low cost and ease of use even for the handicapped operator.

16 Claims, 5 Drawing Sheets

FUEL DISPENSER AID

TECHNICAL FIELD

The present invention relates to an improved aid for dispensing gasoline or other liquids into tanks of vehicles.

BACKGROUND ART

Known valving devices for dispensing gasoline or other fuels through a nozzle into a tank of a vehicle or the like typically comprise a pistol grip-like handle portion through which fuel is dispensed from a hose connected thereto to the nozzle of the valving device and into the tank. A trigger-like valve operating lever is disposed within a trigger guard and extends generally parallel to the pistol grip-like handle portion. An operator grasps the pistol grip-like handle portion with a hand and then extends fingers of the hand about the trigger-like valve operating lever and closes the fingers to move the operating lever upward toward the handle portion. This movement of the operating lever causes a valve of the valving device to open and release gasoline through the nozzle and into the tank at a rate dependent upon the position of the operating lever. These valving devices are in common use at self-serve pumps at gas stations.

A problem with such dispensing is that the trigger-like valve operating lever of the valving devices is biased away from the pistol grip-like handle portion with pressure to hold the valve of the valving device in a normally closed position. An operator must overcome the biasing pressure to dispense gasoline and, if one has weak hands and fingers, the bias is difficult to overcome. Even if one can close the operating lever against the handle portion, it requires continual force to hold the valve open for the time it takes to dispense a full tank of gasoline.

One aid for holding a valve of such a valving device open is to use a hinged plate as a holder for the trigger-like valve operating lever. The hinged plate is attached at one end to the operating lever in such a manner that the other end of the plate moves over a notched member provided on the inside bottom of the trigger guard of the valving device as the operating lever is squeezed open. When one achieves a satisfactory amount of valve openness corresponding to a desired flow of gasoline, the operating lever is eased and the lower end of the holder is pushed into a seat in a notch, holding the operating lever for the operator.

This hinged plate type of holder is commonly employed on attendant-operated gasoline valving devices. A flow pressure sensor mechanism associated with the valving mechanism automatically closes the latter even though the pump is still depressed by the holder to stop gas flow when the fuel tank or other vessel has been filled. Therefore, when the trigger-like operating lever is so depressed it may be considered to be placed in a positional mode for automatic pumping of gas, whereby automatic termination of gas flow occurs to avoid spilling of gasoline. This frees the service station attendant to perform additional functions while gas is automatically pumped. However, one problem for the consumer is that in many self-service gas stations the hinged plate holder is not employed on the valving device or it has been damaged and is inoperative. This known type of holder is also disadvantageous in that untrained customers often do not know how to use the holders such that they must stand at the automobile gas tank and continuously squeeze the operating lever and pistol grip-like handle portion of the valving device to place the operating lever in a positional mode for pumping gas. A further problem is that this known type of hinged plate holder is typically made of metal which is cold to the touch especially in winter time. The hinged type of holder, where used, is also integrated with the valving device at the service station and does not travel with the consumer. Where the pumps at a service station are not equipped with the hinged plate type holder, the consumer must stand and manually depress the operating lever of the valving device throughout pumping.

Flexible strips having a hook and loop material (VELCRO) thereon have been proposed for holding the trigger-like valve operating lever of gasoline valving devices. See for example U.S. Pat. Nos. 4,712,766; 4,811,765 and 4,874,151. These known holding members are disadvantageous in that the operator must employ two hands for depressing the valve operating lever and installing the holding member in a desired set position.

Clips having a predetermined shape or form have also been proposed for holding the operating lever and pistol grip-like handle portion of the valving device for dispensing gasoline or other fuel through a nozzle of the valving device into a tank. U.S. Pat. Nos. 4,095,629; 4,287,736; 4,690,182; 4,846,447 and 5,118,074 illustrate devices of this type. One problem with the clip-type holding device is that they have limited or no adjustability in that they require holding the valve operating lever in a single or one of only several fixed positions during dispensing. The devices are also relatively bulky and require that the operator use both hands for installing the clip on the valving device.

There is a need for an improved fuel dispenser aid which avoids the aforementioned disadvantages of the known devices. More particularly, there is a need for an improved fuel dispenser aid which is simple, and low in cost and which can be installed on a fuel valving device quickly and easily by the operator using only a single hand, if necessary, whereby a handicapped individual can readily use the dispenser aid.

DISCLOSURE OF INVENTION

An object of the present invention is to provide an improved fuel dispenser aid which overcomes the aforementioned problems associated with the known devices. More specifically, an object of the present invention is to provide an improved fuel dispenser aid which is simple, relatively inexpensive to manufacture and easy to use such that, if necessary, the operator can install the fuel dispenser aid on the valving device with one hand for holding the trigger-like valve operating lever in a desired adjustable position.

These and other objects are attained by the improved fuel dispenser aid according to the invention for holding a trigger-like valve operating lever relative to a pistol grip-like handle portion of a valving device for dispensing gasoline or other fuel through a nozzle of the valving device into a tank of the like. The fuel dispenser aid comprises a mounting member formed of a material having a resilient, shape retaining character and configured for mounting over the pistol grip-like handle portion of the valving device. A flexible strap is secured at a first end thereof to the mounting member and extends freely therefrom so that when the mounting member is mounted over the pistol grip-like handle portion of the valving device the free portion of the strap can be looped under the trigger-like operating lever and up to the mounting member. Fastening means are provided for releasably and adjustably fastening the free portion of the strap to the mounting member after the free portion of the strap has been looped under the valve operating lever and up to the mounting member whereby the operating lever can be held in a desired set position relative to the handle portion of the valving device.

The mounting member is preferably a clip which has a shape such that it can be flexed and releasably clipped onto the handle portion of the valving device. According to the disclosed embodiments, preferably one end of the clip is elongated and extends outwardly beyond the other end thereof for guiding the clip onto the handle portion of the valving device. The first end of the strap is secured to this elongated end of the mounting member. Advantageously, the clip can be conveniently held in one hand between the thumb and forefinger during gripping of the handle portion of the valving device with the elongated end being guided along one side of the handle portion and the other end of the clip be flexed outwardly by the opposite side of the handle portion as the clip is installed over the handle portion during gripping. Because the flexible strap is secured at a first end thereof to the elongated end of the clip, the fingers on the hand gripping the handle portion can conveniently pass the strap under the valve operating lever and up to the opposite side of the mounting member where it can be releasably fastened by the fastening means to hold the operating lever in a desired set position. This ease in mounting and also dismounting of the fuel dispenser aid on the valving device makes it possible for the handicapped individual, having the use of only a single hand, to readily employ the fuel dispenser aid for pumping fuel at self-service gas stations. The clip if preferably in the form of a loop which can be mounted over the top of the handle portion.

These and other objects, features and advantages of the present invention will become more apparent from the following description when taken in connection with the accompanying drawings, which show, for purposes of illustration only, several embodiments in accordance with the present invention.

BEST MODE FOR CARRYING OUT THE INVENTION

Figure 1:
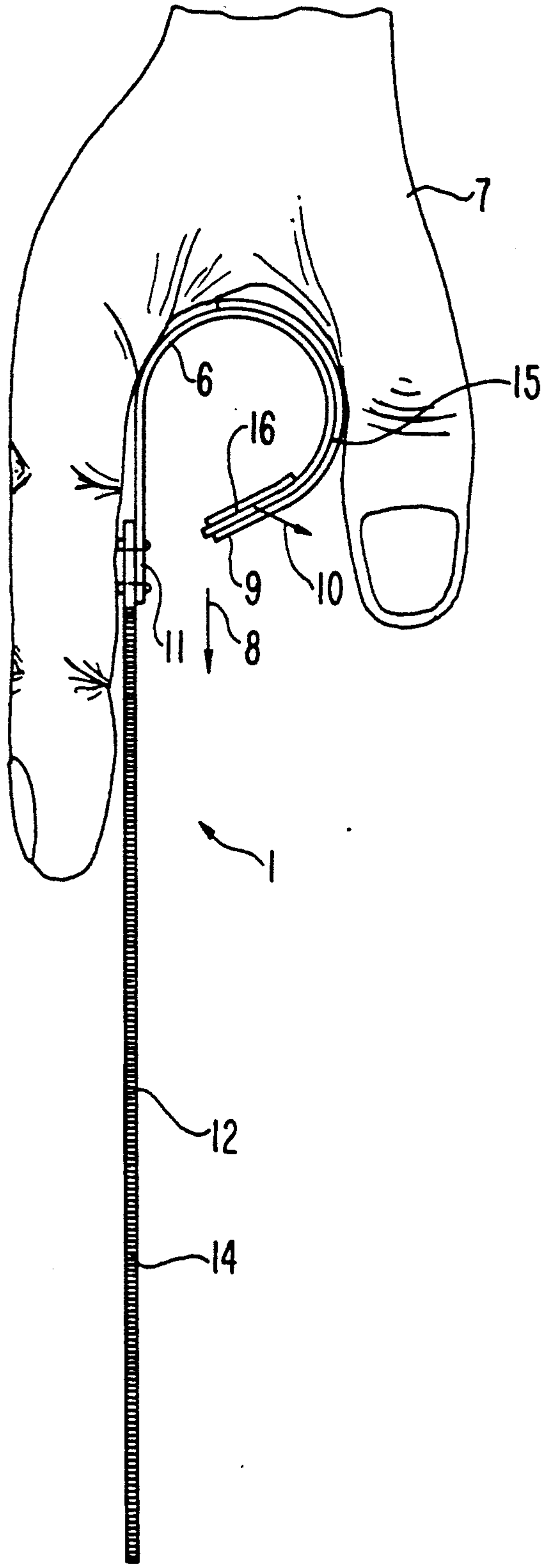
FIG. 1 is a side elevational view of a fuel dispenser aid according to a first embodiment of the invention illustrating the dispenser aid being hand held in a manner for mounting the dispenser aid on a fuel valving device by moving the dispenser aid downward with the hand in the direction of the arrow 8 as shown in the figure.

Referring now to the drawings, the fuel dispenser aid 1 depicted in FIGS. 1–4 is for holding a trigger-like valve operating lever 2 relative to a pistol grip-like handle portion 3 of a valving device 4 for dispensing gasoline or other fuel through a nozzle 5 of the valving device into a tank. The fuel dispenser aid comprises a mounting member 6 formed of a material having a resilient, shape retaining character and configured for mounting over the pistol grip-like handle portion 3 of the valving device 4. The mounting member 6 in the illustrated embodiment is made of a plastic material having a heat-formed shape in the form of a loop which is open on its lower side as shown in FIG. 1 for receiving the handle portion 3 of the valving device when the fuel dispenser aid is held by the operator's hand 7 and forced downwardly in the direction of arrow 8 in FIG. 1 over the handle portion 3 so as to cling to the handle portion. The plastic material of the mounting member 6 has a spring bias so it can be readily snapped onto the handle portion 3. During mounting on the handle portion, the free end 9 of the mounting member is sprung outwardly in the direction of arrow 10 away from the other free end 11 as the mounting member is forced over the handle portion 3 so as to cling to the handle position.

The free end 11 of the mounting member 6 is elongated and extends downwardly from the mounting member beyond the free end 9 thereof. With this construction, the elongated free end 11 advantageously serves as a guide for contacting the handle portion 3 as the fuel dispenser aid is moved downwardly over the handle portion 3 of the valving device. During this downward movement the other free end 9 of the mounting member is forced outwardly in the direction of arrow 10 for accommodating the handle portion 3. Thus, the elongated free end 11 facilitates mounting the dispenser aid on the valving device with only a single hand.

The fuel dispenser aid 1 further comprises a flexible strap 12 secured at the first end thereof by means of a rivet 13 to the elongated free end 11 of the mounting member 6. The flexible strap 12 extends freely from the elongated end 11 such that when the mounting member is mounted over the pistol grip-like handle portion 3 of the valving device 4, the free portion of the strap can be looped under the valve operating lever 2 and up to the opposite side of the mounting member 6 by means of the fingers of the operator's hand 7. This can be done at the same time as the operating lever of the valving device is being moved to the desired set position for dispensing fuel.

Figure 2:
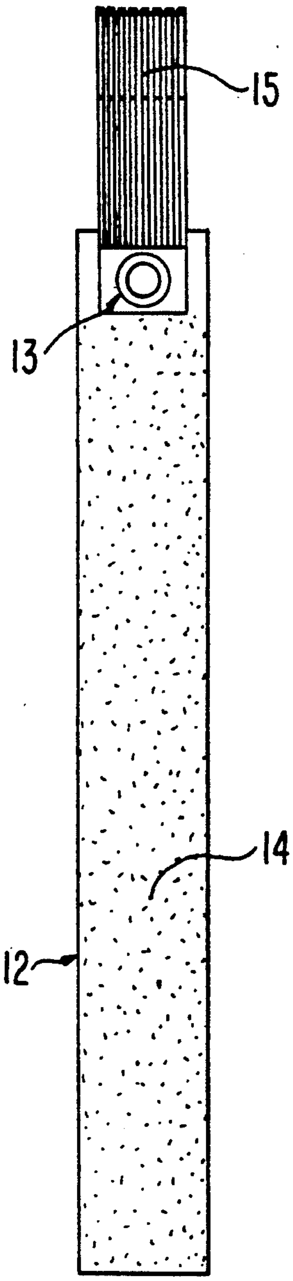
FIG. 2 is a view of the fuel dispenser aid shown in FIG. 1 taken from the right side of the figure and in the absence of the operator's hand.
Figure 3:
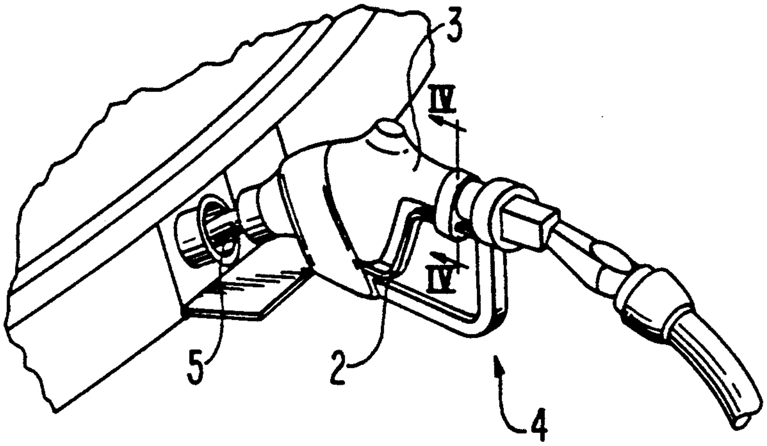
FIG. 3 is schematic illustration of a valving device for dispensing gasoline or other fuel through a nozzle of the valving device into a tank and showing a fuel dispenser aid according to the invention holding the valve operating lever in a selected position.
Figure 4:
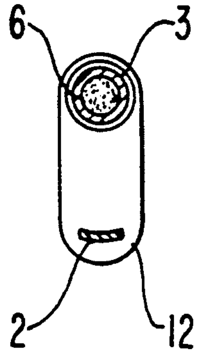
FIG. 4 is schematic, cross-sectional view of the valving device of FIG. 3 with fuel dispenser aid of the present invention taken along the line IV—IV in FIG. 3.

The flexible strap 12 in the illustrated embodiment is a fabric backed strip of VELCRO which is adapted to be releasably fastened at any point along its length to a cooperating VELCRO strip 15 adhered to the top and completely down the right side of the outer surface of the loop of mounting member 6 as shown in FIGS. 1 and 2. This positioning of VELCRO strip 15, as shown in FIGS. 1 and 2, facilitates the one handed operation of the invention. Particularly, the flexible strap 12 is made of female VELCRO or loop material and the strip 15 adhered to the mounting member 6 is male VELCRO or hook material. A grip pad 16 is provided on an inner surface of the loop of the mounting member to further grip a smooth surface of handle portion 3 and discourage the mounting member from rotating about the handle portion. The grip pad is a strip of material having a rough outer surface, like a coarse sandpaper, and is adhesively bonded to the inner surface of the mounting member.

The loop of the mounting member is formed of a material which maintains a given shape when flexed, as noted above. When not in use, the fuel dispenser aid 1 can be stored on the inside of the cover of the gasoline tank, filling closet of the owner's automobile as by the use of additional male VELCRO strip (not shown) which is permanently adhered to the inside of the closet door. In particular, the dispenser aid is readily stored by merely pushing the free end of the strap 12 into the VELCRO on the closet door. Such storing provides an assigned place and discourages loss of the dispenser aid.

Figure 5:
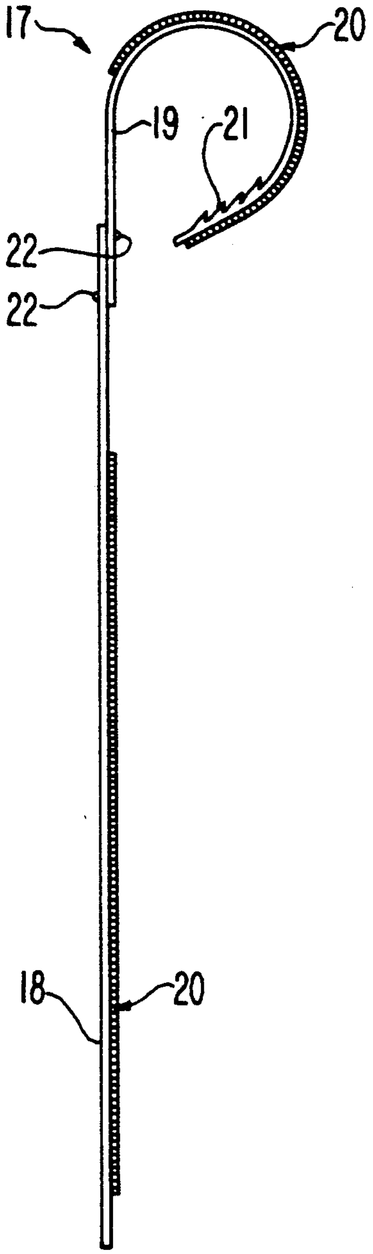
FIG. 5 is a side elevational view of a fuel dispenser aid according to a second embodiment of the invention.
Figure 6:
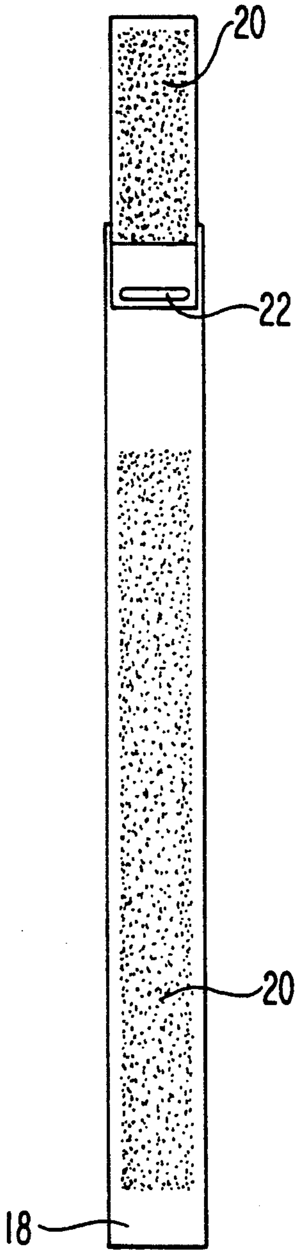
FIG. 6 is a front view of the fuel dispenser aid in FIG. 5 taken from the right side of the dispenser aid as shown in FIG. 5.
Figure 7:
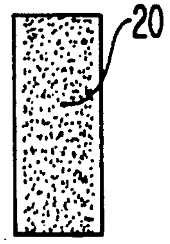
FIG. 7 is a top view of the fuel dispenser aid illustrated in FIGS. 5 and 6.

The fuel dispenser aid 17 of FIGS. 5–7 has a two part, molded plastic design. The flexible strap 18 and the loop-shaped mounting member 19 both have built-in plastic fasteners 20 on opposing faces. The inner surface of the mounting member 19 has notches 21 as built-in grips for gripping the surface of the handle portion 3. The strap 18 and mounting member 19 are connected by means of integrally molded snap-on interlocks 22.

Figure 8:
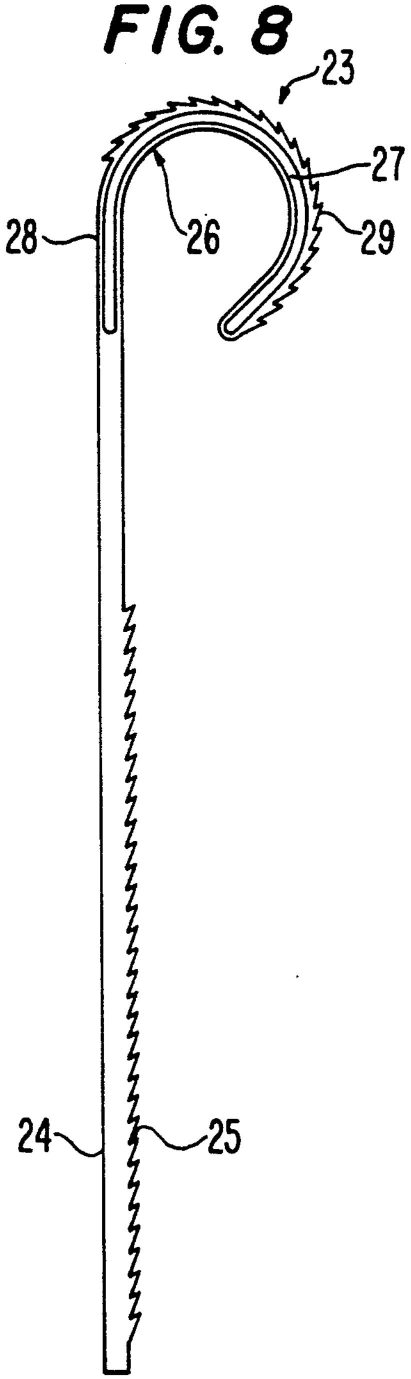
FIG. 8 is a side elevational view of a third embodiment of a fuel dispenser aid of the present invention.
Figure 9:
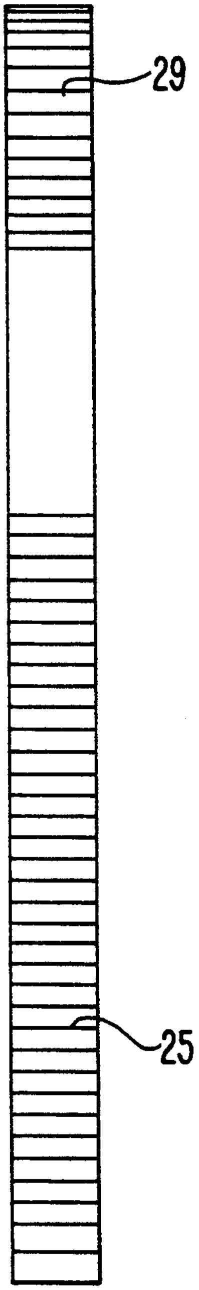
FIG. 9 is a front view of the fuel dispenser aid of FIG. 8 taken from the right side thereof.
Figure 10:
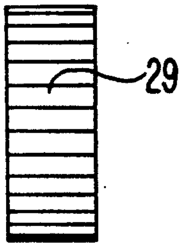
FIG. 10 is a top view of the fuel dispenser aid of FIGS. 8 and 9.

The fuel dispenser aid 23 of FIGS. 8–10 has a composite material design. A flexible strap 24 has gripping teeth 25 molded into its gripping surface. The mounting member 26 of the dispenser aid is in the form of a loop and has an internal, metal spring biased design with a metal spring 27 embedded within rubber or plastic 28 on the outer surface. Gripping teeth 29 are molded on the outer surface of the mounting member. The teeth are disposed opposite in direction to the gripping teeth 25 of the flexible strap 24 to facilitate good connection when brought together. The flexible strap 24 is formed of the same material as the rubber or plastic 28 about the spring 27 of the mounting member 26 such that the dispenser aid can be made in a single molding step.

Figure 11:
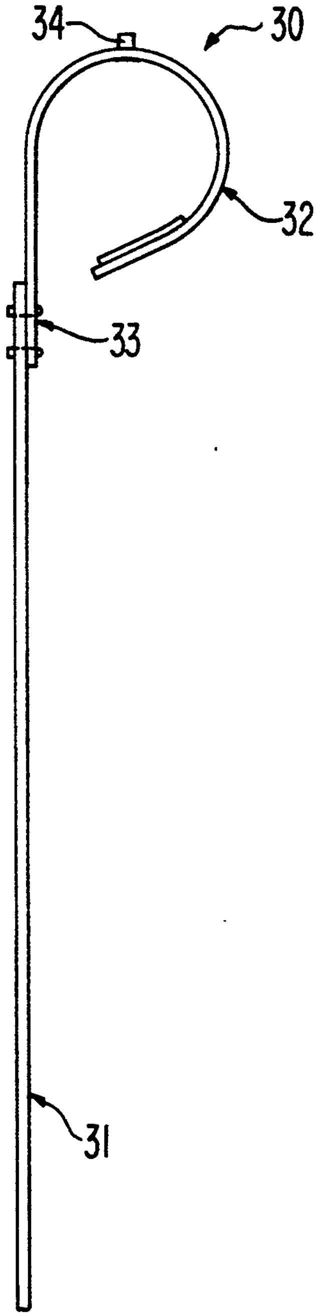
FIG. 11 is a side elevational view of a fourth embodiment of a fuel dispenser aid of the invention.
Figure 12:
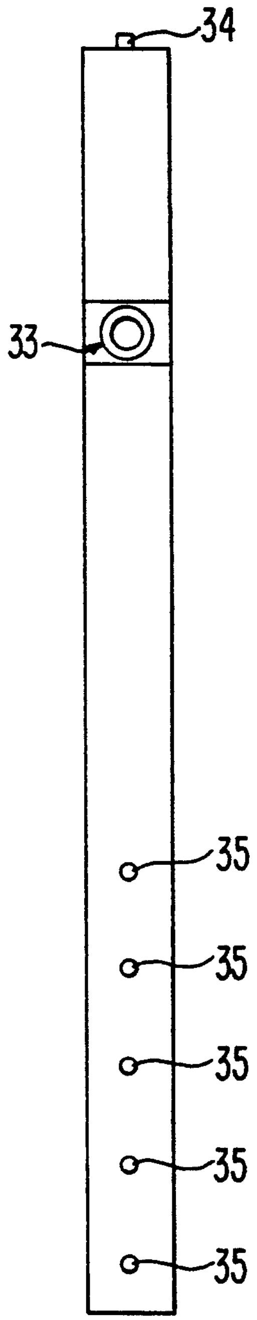
FIG. 12 is a front view of the fuel dispenser aid of FIG. 11 taken from the right side thereof.
Figure 13:
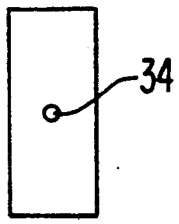
FIG. 13 is top view of the fuel dispenser aid of FIGS. 11 and 12.

The fuel dispenser aid 30 of FIGS. 11–13 has a simple, plastic strip design. A flexible strap 31 is cut or formed as a simple strip. A loop-shaped mounting member 32 is heat formed as a simple strip having a spring-biased loop. The loop 32 and flexible strap 31 may be connected by any convenient means such as by a rivet 33. A post 34 is provided at the top of the loop 32. Holes 35 are provided in the strap 31. Both the post 34 and the holes 35 are sized for connection so that the strap may be passed under a gas valve operating lever and a hole 35 selected to engage the post 34 for holding the operating lever in the desired position.

A post 34, as shown in FIGS. 11–13, may also be provided at the lower right end of the loop 32, which facilitates the one handed operation of the invention.

Each of the disclosed embodiments of the fuel dispenser aid of the invention may be applied to the handle portion 3 of a valving device 5 for holding the valve operating lever 2 thereof in a desired position, by left and right-handed people. The fuel dispenser aid offers hands-free dispensing of fuel and, as described above, may advantageously applied with only one hand for ease of use.

While I have shown and described only several embodiments in accordance with the present invention, it is understood that the same is not limited thereto, but is susceptible to changes and modifications as known to those skilled in the art. Therefore, I do not wish to be limited to the details shown and described herein and intend to cover all such changes and modifications as are encompassed by the scope of the appended claims.

I claim:

1. A fuel dispenser aid for holding a trigger-like valve operating lever relative to a pistol grip-like handle portion of a valving device for dispensing gasoline or other fuels through a nozzle of the valving device, said fuel dispenser aid comprising:

a mounting member formed of a material having a resilient, shape retaining character and configured for mounting over the pistol grip-like handle portion of the valving device, a flexible strap secured at a first end thereof to the mounting member and extending freely therefrom such that when the mounting member is mounted over the pistol grip-like handle portion of the valving device the free portion of the strap can be looped under the trigger-like valve operating lever and up to the mounting member, and fastening means for releasably and adjustably fastening the free portion of the strap to the mounting member after the free portion of the strap has been looped under the valve operating lever and up to the mounting member whereby the valve operating lever can be held in a desired set position relative to the handle portion of the valving device for dispensing fuel without requiring that the operating lever of the valving device continuously be manually held in said set position.

2. A fuel dispenser aid according to claim 1, wherein said mounting member is a clip which has a shape such that it can be flexed and releasably clipped onto said handle portion of the valving device.

3. A fuel dispenser aid according to claim 2, wherein said clip is in the form of a loop which is open on one side for receiving the handle portion of the valving device.

4. A fuel dispenser aid according to claim 3, wherein one end of the loop of the mounting member is elongated and extends outwardly from said loop beyond the other end thereof for guiding the clip onto the handle portion of the valving device, said first end of said flexible strap being secured to said on end of the loop.

5. A fuel dispenser aid according to claim 1, wherein said mounting member is provided with gripping means for resisting slipping of the mounting member relative to the handle portion of the valving device when the fuel dispenser aid is mounted on the valving device.

6. A fuel dispenser aid according to claim 5, wherein said gripping means includes a grip pad attached to a surface of the mounting member which faces the handle portion when the mounting member is mounted thereon.

7. A fuel dispenser aid according to claim 5, wherein said gripping means includes built-in gripping teeth formed integrally with said mounting member on a surface of the mounting member which faces the handle portion when the mounting member is mounted thereon.

8. A fuel dispenser aid according to claim 1, wherein said fastening means includes loop material and hook material adapted to be releasably fastened to each other, said loop material being provided on one of said flexible strap and said mounting member and said hook material being provided on the other of said flexible strap and said mounting member.

9. A fuel dispenser aid according to claim 8, wherein the one of the loop material and the hook material on the flexible strap extends along at least substantially the entire length of the strap for adjustably fastening the strap on the mounting member.

10. A fuel dispenser aid according to claim 1, wherein said mounting member and said strap are each formed of molded plastic and wherein said fastening means includes built-in plastic fasteners integrally molded with each of said mounting member and said strap.

11. A fuel dispenser aid according to claim 1, wherein said strap is secured at said first end thereof to the mounting member by a rivet.

12. A fuel dispenser aid according to claim 1, wherein said strap is secured at said first end thereof to the mounting member by a snap arrangement between the mounting member and the strap.

13. A fuel dispenser aid according to claim 1, wherein the material of said mounting member is a composite formed of a resilient shape retaining clip molded within flexible outer material.

14. A fuel dispenser aid according to claim 13, wherein said strap is composed of the same material as said flexible outer material of said mounting member and is formed integrally therewith.

15. A fuel dispenser aid according to claim 14, wherein said fastening means include grips formed integrally with the flexible molded material on respective surfaces of the mounting member and strap for interlocking with one another when engaged.

16. A fuel dispenser aid according to claim 1, wherein said fastening means includes an upstanding projection on said mounting member and a plurality of holes in the strap for respectively accommodating said projection to adjustably fasten the strap to the mounting member.

* * * * *